United States Patent
Neubauer et al.

[11] Patent Number: 5,924,327
[45] Date of Patent: Jul. 20, 1999

[54] SHIFT DEVICE FOR A CHANGE SPEED GEARBOX

[75] Inventors: Hans-Jürgen Neubauer, Remshalden; Martin Schetter, Besigheim, both of Germany

[73] Assignee: Mercedes-Benz AG, Stuttgart, Germany

[21] Appl. No.: 08/815,263

[22] Filed: Mar. 10, 1997

[30] Foreign Application Priority Data

Mar. 9, 1996 [DE] Germany .......................... 196 09 210

[51] Int. Cl.$^6$ ................................................ F16H 63/34
[52] U.S. Cl. .................................... 74/473.25; 74/473.27; 74/473.21
[58] Field of Search ........................... 74/473.24, 473.25, 74/483 R, 473.27

[56] References Cited

U.S. PATENT DOCUMENTS

| | | | |
|---|---|---|---|
| 3,258,986 | 7/1966 | Phillips et al. | 74/473.21 |
| 3,731,554 | 5/1973 | Renk | 74/473.21 |
| 4,784,009 | 11/1988 | Sakamoto et al. | 74/473.21 |
| 5,186,070 | 2/1993 | Nitzschke et al. | 74/473.24 |
| 5,191,806 | 3/1993 | De Silvestri . | |

FOREIGN PATENT DOCUMENTS

| | | |
|---|---|---|
| 0331278A2 | 9/1989 | European Pat. Off. . |
| 2132736 | 1/1973 | Germany . |
| 2930151A1 | 2/1980 | Germany . |
| 4118931A1 | 12/1992 | Germany . |

OTHER PUBLICATIONS

European Search Report, Feb. 7 1998.

*Primary Examiner*—Charles A. Marmor
*Assistant Examiner*—William C Joyce
*Attorney, Agent, or Firm*—Evenson, McKeown, Edwards & Lenahan, PLLC

[57] ABSTRACT

A shifting assembly for a change speed gearbox includes axially displaceable shift rods and pivotably displaceable shift rockers for actuating respective gear wheel clutches. Locking elements in the form of linear pins and pivotal members are abuttingly engaged with the respective shifting mechanisms so as to assure locking of all other shift rockers and shift rods when one of the shift rockers and shift rods is moved to a clutch actuating position.

27 Claims, 6 Drawing Sheets

SHIFT DEVICE FOR A CHANGE SPEED GEARBOX

BACKGROUND AND SUMMARY OF THE INVENTION

This application claims the priority of German application 196 09 210.8 filed in Germany on Mar. 9, 1996, the disclosure of which is expressly incorporated by reference herein.

This application is also related to commonly assigned U.S. application Ser. No. 08/815,264 filed herewith, based on German application number 196 09 209.4 filed in Germany on Mar. 9, 1996, the contents of which are incorporated by reference thereto.

The invention relates to a shift device for a change speed gearbox having two or more clutches for coupling a gear wheel to a gearbox shaft.

In a shift device of this general type described in German Patent Document DE 41 18 931 A1, the pivotably movable locking element is constructed in the form of a two-armed locking lever which is pivotably mounted on the gearbox casing at a central point located between its two lever ends. On its one lever arm it has a recess for engagement of the linearly movable locking element and interacts with its other lever end by means of a locking cam with a corresponding mating cam contour of the shift rocker, in such a way that the locking cam is held, in the neutral position of the shift rocker corresponding to the disengaged state of the gear wheel clutch, in engagement with the mating cam contour on the shift rocker by means of a restoring spring which acts on the locking lever—and, on the other hand, when the shift rocker is activated into a gear speed position corresponding to the engaged state of the other gear wheel clutch, the locking cam is pivoted by the mating cam contour into its other end position in which it is no longer the recess of the locking lever but rather its locking face which is congruent with the geometric axis for the movements of the linearly movable locking element. When an additional shift rocker is used in this known shift device, a second two-armed locking lever which interacts with the second shift rocker and an intermediate locking linkage which interacts with both two-armed locking levers and also with the first shift rocker must be provided, so that this known shift device requires a complicated design.

German Patent Document DE-A 21 32 736 also discloses a shift device for change speed gearboxes of vehicles having three shift rods to be locked, in which shift device cylindrical spring-loaded locking elements are arranged between the shift rods, the locking elements being axially displaceably secured in a bearing hole of the gearbox casing, and in which shift device the shift rods are arranged in the form of a triangle. In order to be able to lock in each case two shift rods at the same time and only release one for shifting gears—the required shift means and their bearing being easy to manufacture, being arranged in a space-saving fashion and being intended to permit reliable locking—in this known shift locking device the arrangement is effected in such a way that the locking elements are displaceably mounted in a bearing hole, connecting two shift rods, of the gearbox casing, the locking elements being provided with sloping faces at one end in the region of a further locking hole which opens into the bearing hole at a right angle, and a sphere which interacts with the sloping faces of the locking elements being inserted into the locking hole.

Finally, German Patent Document DE 29 30 151 A1 also discloses a change speed gearbox of the countershaft type, in which three shift rods arranged parallel to the gearbox shafts are mounted axially displaceably in a gearbox casing which is connected to a clutch casing using flanges, of which shift rods two are connected fixedly in terms of movement in each case to the fork shaft of an associated linearly movable shift fork and the third is connected in an articulated fashion to the fork shaft of an associated shift fork which is mounted so as to be pivotable in relation to the gearbox casing.

An object on which the invention is based is to provide a shift device of the type mentioned above which is both distinguished by a simple design of the locking mechanism and can be easily extended for use by more than one shift rocker and/or shift rod.

This object is advantageously achieved according to the preferred embodiments of the invention by providing a shifting assembly comprising a first axially displaceable shift rod operable to actuate a first gear wheel clutch, a first pivotably displaceable shift rocker operable to actuate a second gear wheel clutch, a first pivotably movable locking element carried by the first shift rocker, and a first linearly movable locking element extending transversely to, and selectively lockingly engaging with the first shift rod, wherein said first pivotably movable locking element and first linearly movable locking element are configured to assure locking of the first shift rocker against actuation of the second clutch when the first shift rod is actuating the first clutch and locking of the first shift rod against actuation of the first clutch when the first shift rocker is actuating the second clutch.

In the shift device according to the invention, the casing-side pivot bearing and the restoring spring for the pivotably movable locking element are omitted and the precision of the kinematic interaction between the shift rocker and pivotably movable locking element is optimized by a respective arrangement of a pivot bearing.

In the shift device according to the invention, the locking members are brought into effect between the shift rod and shift rocker over the shortest possible path.

Shift devices according to certain preferred embodiments of the invention include locking members which are easily and advantageously adapted to the extension of the shift assembly to include a second shift rocker operable to actuate a third gear wheel clutch and a second pivotably movable locking element carried by the second shift rocker and with corresponding locking elements to effectively control against undesired simultaneous activation of any of the first, second and third clutches.

Shift devices according to certain preferred embodiments of the invention include locking elements which are easily and advantageously adapted to the extension of the shift assembly to include a second axially displaceable shift rod to activate a fourth gear wheel clutch, a second linearly displaceable locking element engageable to lock the second shift rod and with corresponding locking elements to effectively control against undesired simultaneous actuation of any of the first to fourth clutches.

In shift devices constructed according to preferred embodiments of the invention, linearly and pivotably movable locking elements are directly moved into mutual engagement by means of their inclined faces. This engagement is made easier when in each case a sphere is intermediately connected in accordance with especially preferred embodiments of the invention.

In especially preferred embodiments the shifting assemblies include essentially the advantageous refinements of the locking elements, including a locking mechanism casing with accommodates the latter, using sheet-steel stamping technology.

In shift devices constructed according to the invention, no additional shift rods are required for activating or locking the shift rockers.

In shift devices constructed according to the invention, the number of the totality of gear wheel clutches for the gearbox shafts does not preclude utilization of the novel locking assembly arrangement.

In shift devices constructed according to the invention, the number of activation mechanisms of the gear wheel clutches formed by the shift rockers does not preclude utilization of the novel locking assembly arrangement.

In shift devices according to preferred embodiments of the invention, a central shift shaft with a plurality of shift fingers for actuating all the gear wheel clutches may be used—in particular with one shift finger for each of the shift rockers.

In shift devices according to preferred embodiments of the invention, a "spectacle-shaped" end plate arranged in the center of the gearbox bears a central locking mechanism casing in which the movements of all the shift rods and rockers are brought together.

In shift devices according to preferred embodiments of the invention, the locking mechanism casing which accommodates the spheres and locking elements can be suspended, as a premounted physical unit, from an end shield of the gearbox.

In shift devices according to preferred embodiments of the invention, a low-friction support of the forces induced on the gear shift lever by the driver is achieved by resting the shift fingers directly on the shift rockers and thus on the pivots of the rockers with a step-down ratio of the friction moments, caused by the force support, in the ratio bolt radius/radius of engagement.

Other objects, advantages and novel features of the present invention will become apparent from the following detailed description of the invention when considered in conjunction with the accompanying drawings.

DETAILED DESCRIPTION OF THE DRAWINGS

Figure 1:
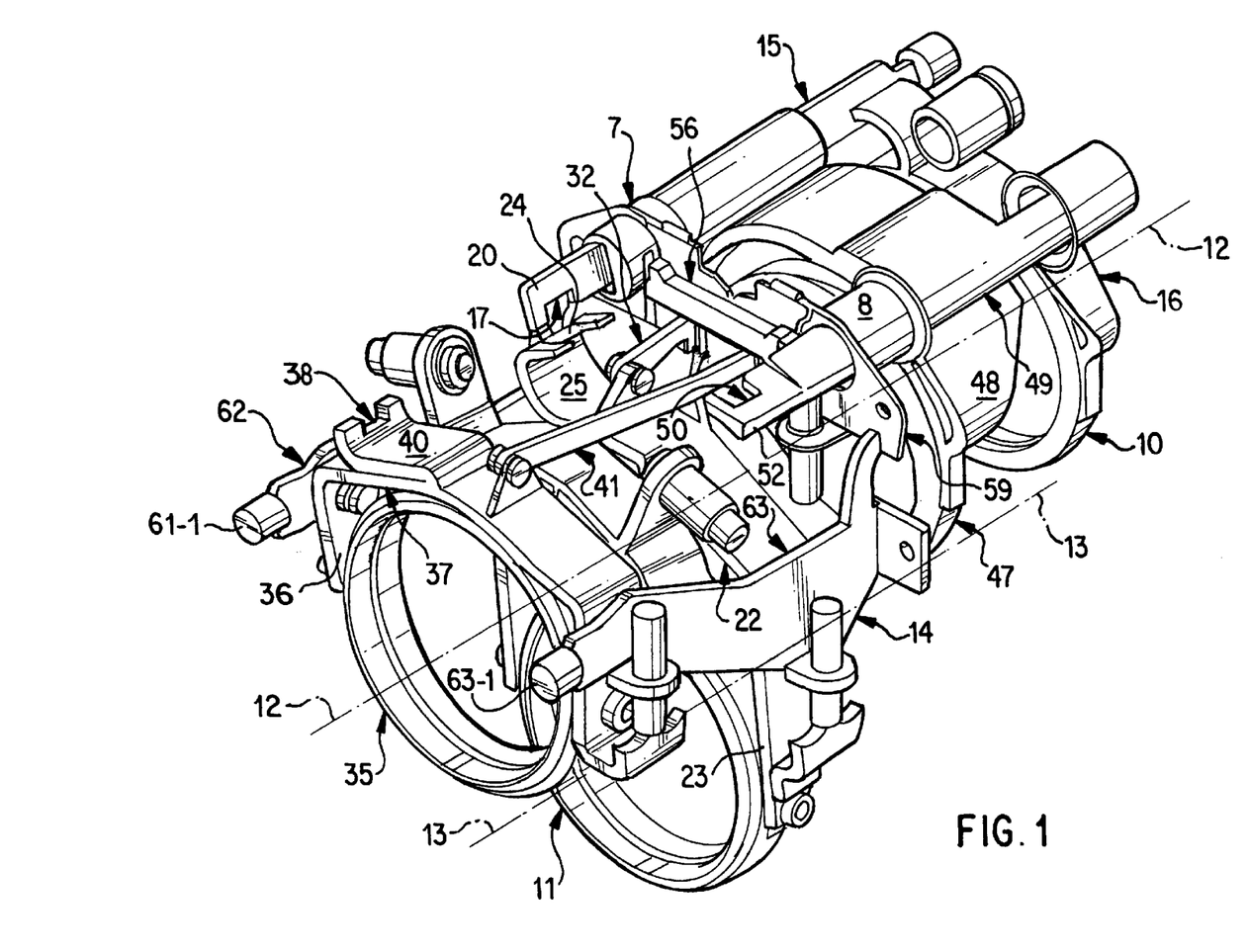
FIG. 1 is a schematic perspective view of a shift device according to the invention for a change speed gearbox (not illustrated in more detail), viewed in the direction of the arrow I in FIG. 2.
Figure 2:
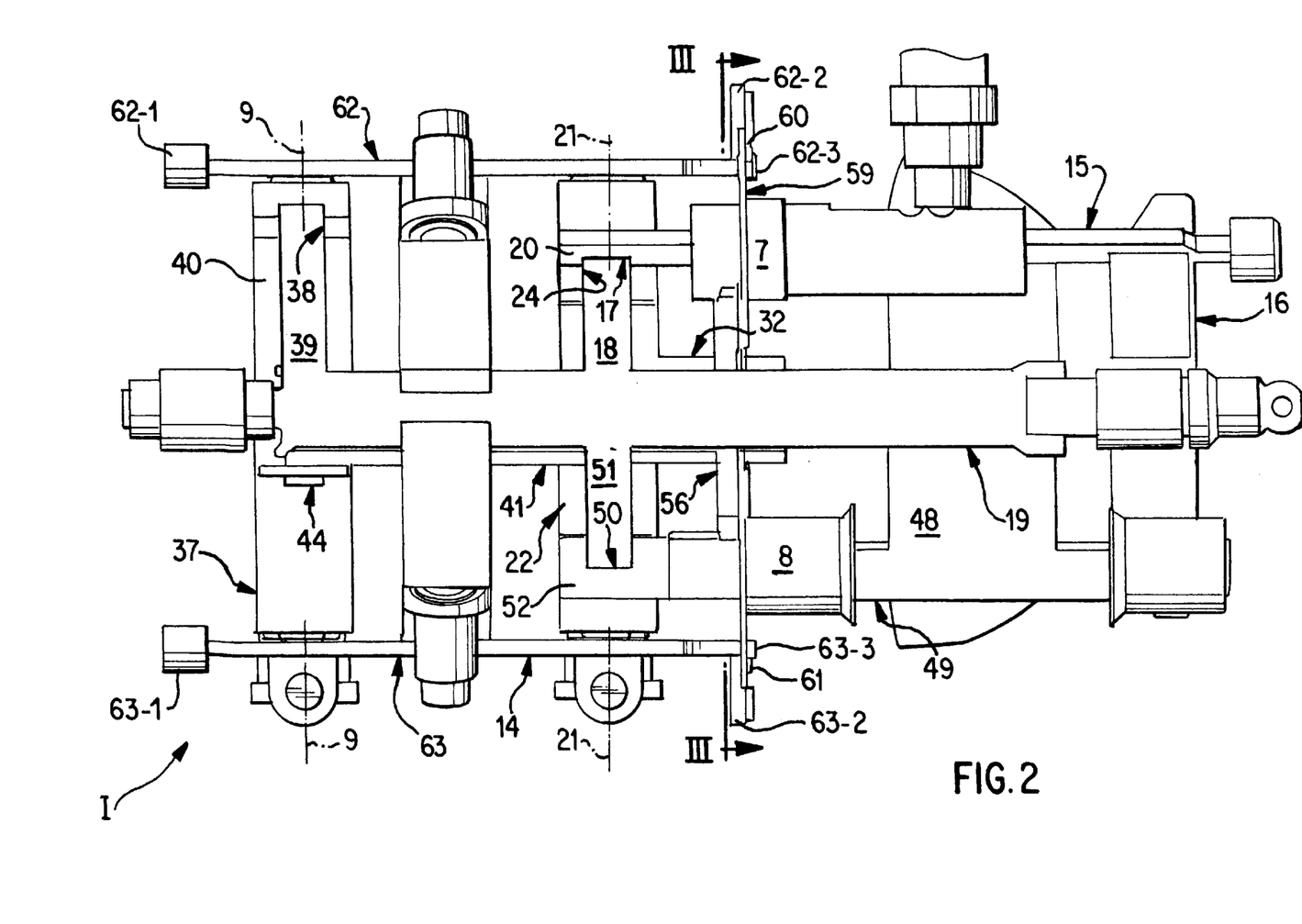
FIG. 2 is a plan schematic view of the shift device of FIG. 1, supplemented with a shift shaft.
Figure 3:
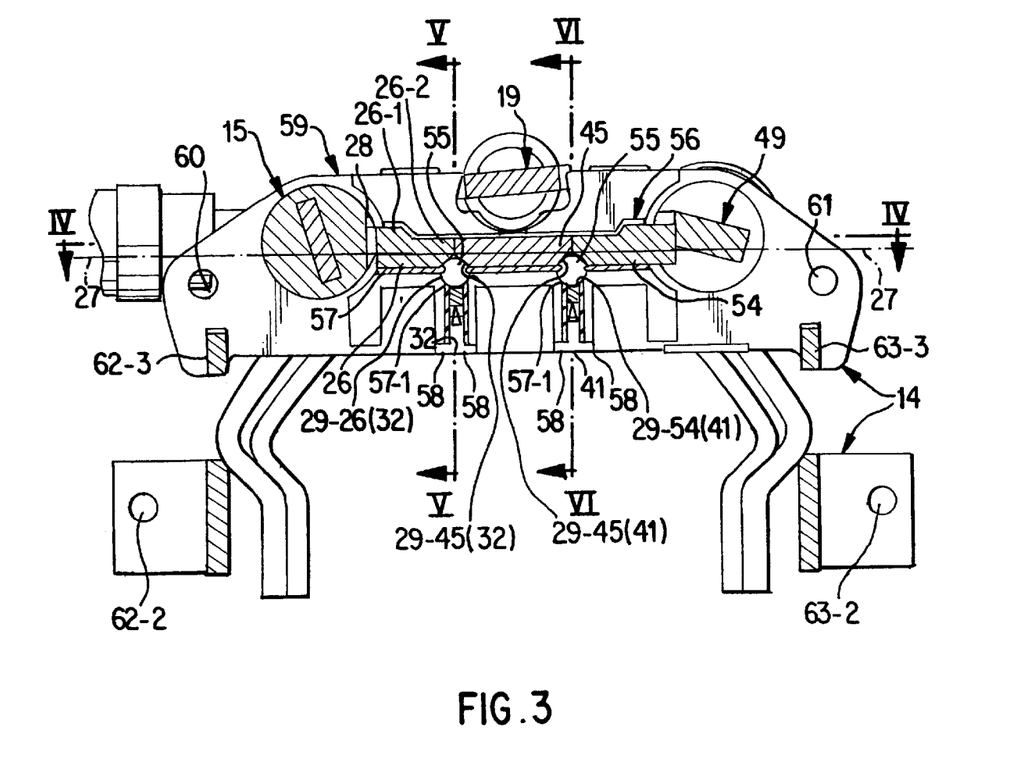
FIG. 3 is a cross-sectional view through the shift device of FIG. 2 along the line III—III.
Figure 4:
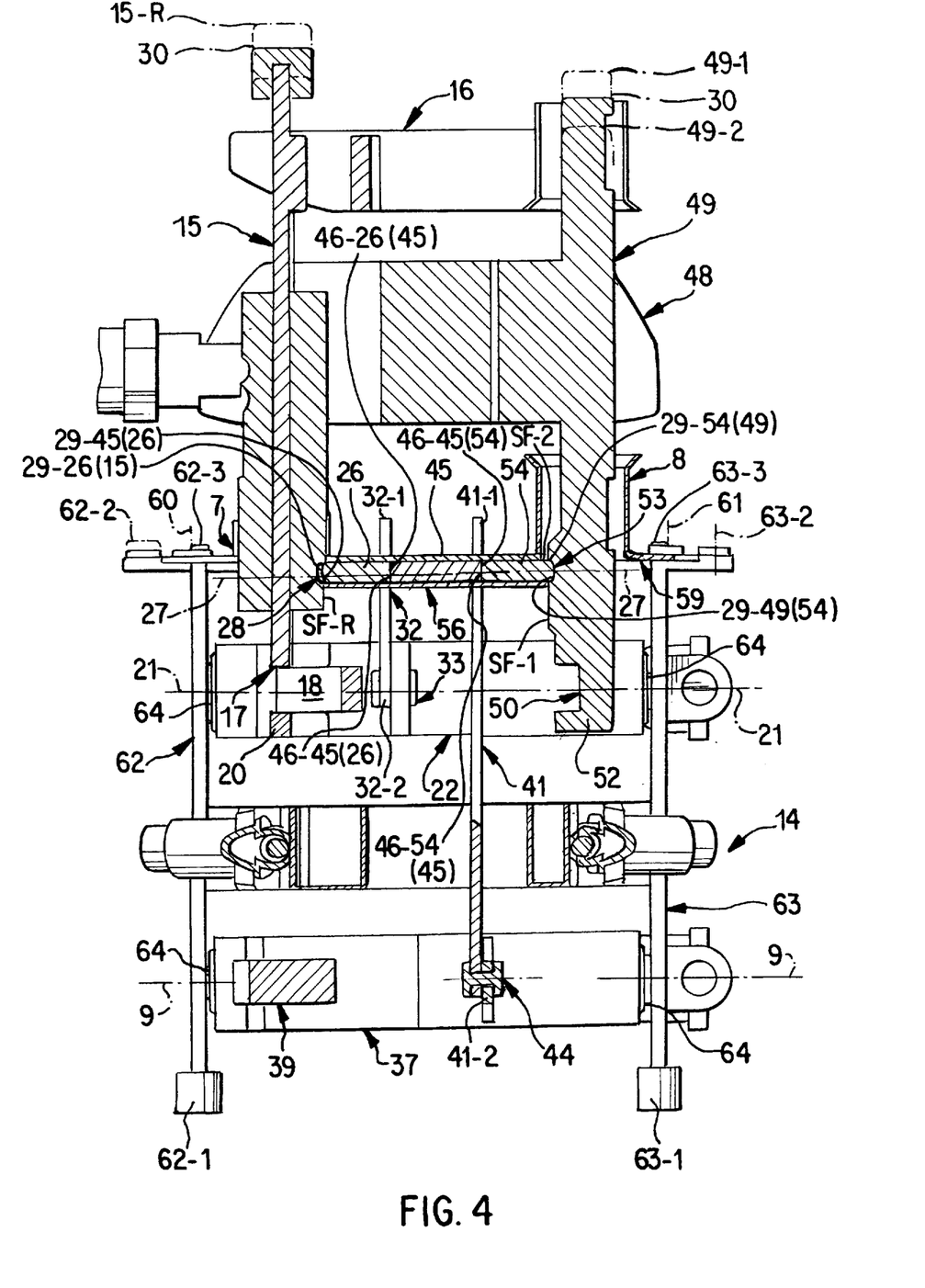
FIG. 4 is a longitudinal sectional view through the shift device of FIG. 2 along the line IV—IV in FIG. 3.

With regard initially to FIG. 1, arranged concentrically with respect to the axis of rotation 12—12 of the input shaft and output shaft of a change speed gearbox are a sliding shift sleeve 10 of a gear wheel clutch for coupling a gear wheel to the output shaft, a sliding shift sleeve 47 of a gear wheel clutch for optionally coupling one of two further gear wheels to the output shaft as well as a sliding shift sleeve 35 of a gear wheel clutch for optionally coupling a further gear wheel or the input shaft to the output shaft.

Arranged concentrically with respect to the axis of rotation 13—13 of a countershaft parallel to the input shaft and output shaft is a fourth sliding shift sleeve 11 of a gear wheel clutch for optionally coupling one of two gear wheels to the countershaft.

The sliding shift sleeve 10 is activated in the usual fashion by a shift fork 16 which is permanently connected to a shift rod 15 which is arranged with its axis parallel to the gearbox shafts and axially displaceably in relation to the gearbox casing (not illustrated in more detail) and is constructed in one piece with a driver 20. The driver 20 has a shift slot 17 for engagement of a shift finger 18 of a shift shaft 19 which is arranged with its axis parallel to the gearbox shafts and is both axially displaceable and rotatable in the gearbox casing.

The sliding shift sleeve 47 is activated in the usual fashion by a shift fork 48 which is connected fixedly in terms of movement to a shift rod 49 which is arranged with its axis parallel to the gearbox shafts and is axially displaceably in the gearbox casing. The shift rod 49 is constructed in one piece with a driver 52 which has a shift slot 50 for engagement of a shift finger 51 of the shift shaft 19.

The sliding shift sleeve 11 is activated in the usual fashion by a shift fork 23 by means of two sliding blocks, the shift fork 23 being constructed in one piece with a shift rocker 22. The shift rocker 22 is pivotably mounted in relation to the gearbox casing about a geometric pivot axis 21—21 which is aligned perpendicularly with respect to the gearbox shafts. The shift rocker 22 is connected fixedly in terms of movement to a driver 25 which has a shift slot 24 for engagement of the shift finger 18.

The sliding shift sleeve 35 is activated in the usual fashion by a shift fork 36 by means of two sliding blocks, the shift fork 36 being constructed in one piece with a shift rocker 37. The shift rocker 37 is pivotably mounted in relation to the gearbox casing about a geometric pivot axis 9—9 which is aligned perpendicularly to the gearbox shafts. The shift rocker 37 is connected fixedly in terms of movement to a driver 40 which has a shift slot 38 for engagement of a shift finger 39 of the shift shaft 19.

The shift rod 15 has a recess 28 facing the shift rod 49, for engagement of a linearly movable blocking element 26. In the neutral position 30 of the shift rod 15 corresponding to the disengaged state of the sliding shift sleeve 10, the recess 28 is congruent with a geometric axis 27—27 which is aligned perpendicularly with respect to the shift rod 15 and forms, as it were, the movement path of the locking element 26 which is axially displaceably accommodated in a locking mechanism casing 56 which is arranged fixedly in terms of movement with respect to the gearbox casing.

The recess 28 and the facing ends 26-1 of the locking element 26 interact by means of corresponding inclined faces 29-15(26) and 29-26(15), in such a way that when the shift rod 15 is activated in its gear speed position 15-R corresponding to the engaged state of the sliding shift sleeve 10, the locking element 26 is activated in the direction of the geometric axis 27—27 pointing away from the shift rod 15, and an assigned locking face SF-R of the shift rod 15 is congruent with the geometric axis 27—27, the locking face SF-R blocking displacement of the locking element 26 in the opposite direction.

Figure 5:
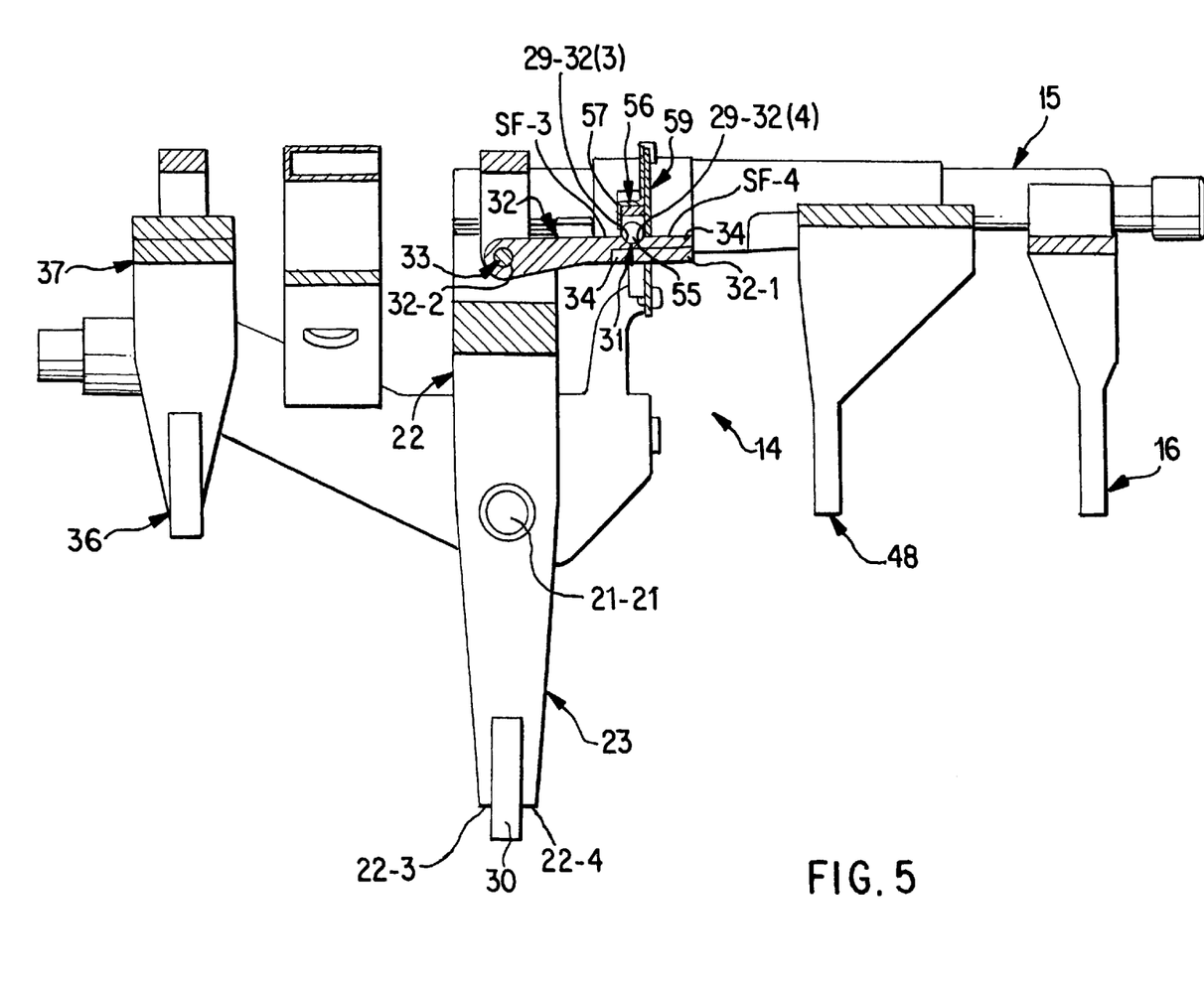
FIG. 5 is a longitudinal sectional view through the shift device of FIG. 2 along the line V—V in FIG. 3.

Arranged in a casing plane V—V of the gearbox casing which is perpendicular with respect to the geometric axis 27—27 is a pivotably movable locking element 32 which has at its one end 32-1 a recess 31 and is at its other end 32-2 pivotably movably connected to the shift rocker 22 by means of a joint 33. The one end 32-1 of the pivotably movable locking element 32 which has the recess 31 is mounted by means of the end plate 59 in such a way that the pivoting movement about the joint 33 has super-imposed on it a linear movement in the directions of a geometric axis 34—34 which is aligned approximately perpendicularly with respect to the geometric axis 27—27. In the neutral position 30 of the shift rocker 22 corresponding to the disengaged state of the sliding shift sleeve 11, the recess 31 of the pivotably movable locking element 32 is congruent with the geometric axis 27—27 of the linearly movable locking element 26. In the gear speed position 22-3 of the shift rocker 22 corresponding to the engaged state of the sliding shift sleeve 11 with regard to the one gear wheel, an assigned locking face SF-3 of the pivotably movable locking element 32 is congruent with the geometric axis 27—27. In the gear speed position 22-4 of the shift rocker 22 corresponding to the engaged state of the sliding shift sleeve 11 with regard to the other gear wheel, an assigned locking face SF-4 of the pivotably movable locking element 32 is congruent with the geometric axis 27—27.

That end 26-2 of the linearly movable locking element 26 which is located opposite the shift rod 15 and the recess 31 of the pivotably movable locking element 32 interact using corresponding inclined faces 29-26(32) on the one hand and 2932(3.) and 29-32(4.) on the other and with the intermediate connection of a sphere 55, in such a way that, in the gear speed position 15-R of the shift rod 15, the pivotably movable locking element 32 is essentially immovably secured in relation to the gearbox casing by the linearly movable locking element 26, which is supported on the locking face SF-R, and by means of the sphere 55 which is displaced into the recess 31, while the linearly movable locking element 26 engages with its one end 26-1 in the recess 28 of the shift rod 15, when the shift rocker 22 is in one of its two gear speed positions 22-3 or 22-4 and, as a result, the pivotably movable locking element 32 supports, with its respective locking face SF-3 or SF-4, the sphere 55 which is displaced out of the recess 31 and, in turn, keeps the linearly movable locking element 26 in its locked position in the recess 28.

In the event of other contemplated embodiments wherein only the shift rod 15 and the shift rocker 22 are used as shift means or a further shift rod with mutual locking effect in relation to the shift rod 15 in accordance with DE 41 18 931 A1 is provided, the sphere 55 could be capable of being supported on a casing wall of the locking mechanism casing 56 in the direction of the geometric axis 27—27 pointing away from the shift rod 15.

Figure 6:
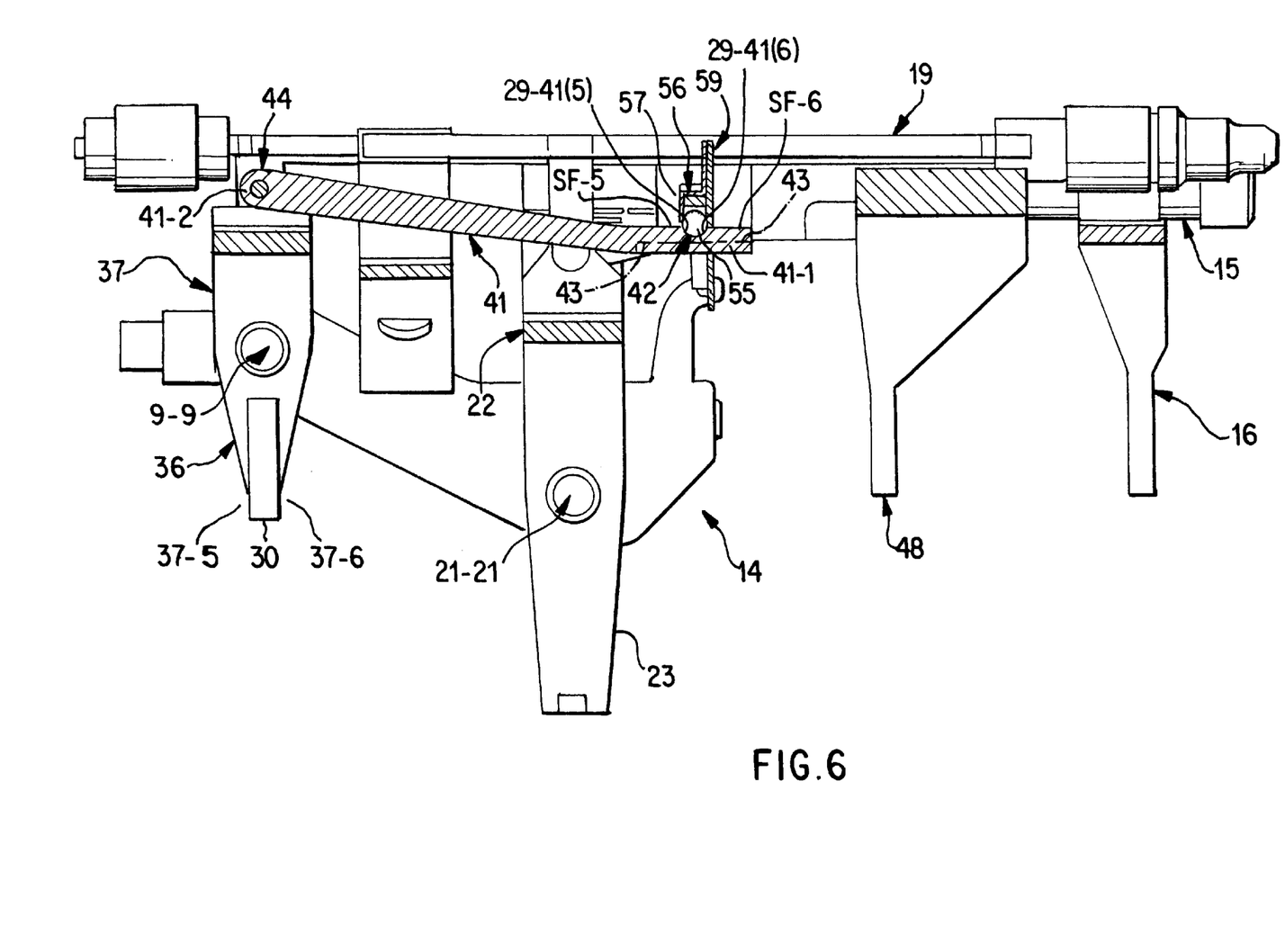
FIG. 6 is a longitudinal sectional view through the shift device of FIG. 2 along the line VI—VI in FIG. 3.

Arranged in a casing plane VI—VI of the gearbox casing which is parallel to the casing plane V—V is a second pivotably movable locking element 41 which is mounted with its one end 41-1, on which a recess 42 is provided, so as to be displaceable in relation to the locking mechanism casing 56 in the directions of a geometric axis 43—43 and is pivotably movably connected at its other end 41-2 to the shift rocker 37 by means of a joint 44. The geometric axis 43—43 is located perpendicularly with respect to the geometric axis 27—27 of the locking element 26. In the neutral position 30 of the shift rocker 37 corresponding to the disengaged state of the associated gear wheel clutches, the recess 42 is congruent with the geometric axis 27—27 of the linearly movable locking element 26. In the gear speed position 37-5 of the shift rocker 37 corresponding to the engaged state of the sliding shift sleeve 35 with regard to the one gear wheel, an assigned locking face SF-5 of the pivotably movable locking element 41 is congruent with the geometric axis 27—27 of the linearly movable locking element 26. In the gear speed position 37-6 of the sliding shift sleeve 37 corresponding to the engaged state of the sliding shift sleeve 35 with regard to the other gear wheel, an assigned locking face SF-6 of the pivotably movable locking element 41 is congruent with the geometric axis 27—27 of the linearly movable locking element 26.

The second pivotably movable locking element 41 interacts with the first linearly movable locking element 26 by means of a second linearly movable locking element 45 which is likewise accommodated in the locking mechanism casing 56 and is displaceably guided in the latter along the geometric axis 27—27 for the movements of the first linearly movable locking element 26. The second linearly movable locking element 45—whose extent in the directions of the axis 27—27 corresponds approximately to the mutual distance between the casing planes V—V and VI—VI—is provided at its end facing the shift rod 15 both with inclined faces 29-45(32) for engagement in the recess 31 of the first pivotably movable locking element 32 (by means of the respective sphere 55) and with a stop face 46-45(26), which is normal with respect to the axis, for the mutual support with the first linearly movable locking element 26. The second linearly movable locking element 45 is provided at its end located opposite the shift rod 15 both with inclined faces 29-45(41) for engagement in the recess 42, provided with corresponding inclined faces 29-45(5.) and 29-41(6.), of the second pivotably movable locking element 41, again with the intermediate connection of a sphere 55, and with a stop face 46-45(54) which is normal with respect to the axis.

The second pivotably movable locking element 41 interacts with the second linearly movable locking element 45 in such a way that, in the gear speed positions 37-5 and 37-6 of the second shift rod 37, in each case, on the one hand the second linearly movable locking element 45, which is activated by the sphere 55 displaced from the recess 42, engages, by means of its inclined faces 29-45(32) , in the recess 31 of the first pivotably movable locking element 32 by means of the respective sphere 55 and, on the other hand, keeps, by means of its stop face 46-45(26) which is normal with respect to the axis, the first linearly movable locking element 26 in its end position for engagement in the recess 28 of the shift rod 15.

The second pivotably movable locking element 41 continues to interact with the second linearly movable locking element 45 in such a way that, in the gear speed position 15-R of the shift rod 15, the second linearly movable locking element 45 is activated, by means of the adjacent stop face 46-26(45) of the first linearly movable locking element 26, into its end position for engagement in the recess 42 of the second pivotably movable locking element 41 by means of the respective sloping faces 29-45(41) and the intermediately positioned sphere 55.

Finally, the second pivotably movable locking element 41 still interacts with the second linearly movable locking element 45 in such a way that, in the gear speed positions 22-3 and 22-4 of the first shift rocker 22, the sphere 55 which is displaced out of the recess 31 of the first pivotably movable locking element 32 activates the second linearly movable locking element 45, by means of its adjacent inclined faces 29-45(32), into the end position for engagement in the recess 42 of the second pivotably movable locking element 41 by means of the associated inclined faces 29-45(41) and the intermediately positioned sphere 55.

In the event of other contemplated embodiments, wherein only the shift rod 15 and the shift rockers 22 and 37 are used as shift means or a further shift rod with mutual locking effect in relation to the shift rod 15 in accordance with DE 41 18 931 A1is provided, the sphere 55, assigned to the recess 42, could be capable of being supported on a casing wall of the locking mechanism casing 56 in the direction pointing away from the shift rod 15.

The second shift rod 49 has assigned to it a linearly movable locking element 54 which is additionally accommodated in the locking mechanism casing 56 so as to be capable of being displaced along the geometric axis 27—27, and the extent of the locking mechanism casing 56 in the directions of the axis 27—27 corresponds essentially to the distance between the casing plane VI—VI and a recess 53 of the shift rod 49. The linearly movable locking element 54 which is assigned to the shift rod 49 has, at its end facing the shift rod 15, both inclined faces 29-54(41) for engagement in the recess 42 of the second pivotably movable locking element 41 by means of the respective sphere 55 and a stop face 46-54(45), which is normal with respect to the axis, for the mutual support with the facing end of the second linearly movable locking element 45. The linearly movable locking element 54 which is associated with the second shift rod 49 has, at its end facing the shift rod 49, inclined faces 29-54(49) which interact with corresponding inclined faces 29-49(54) of the recess 53.

In the neutral position 30 of the shift rod 49 corresponding to the disengaged state of the sliding shift sleeve 47, the recess 53 is congruent with the geometric axis 27—27 of the first linearly movable locking element 26. In the gear speed position 49-1 of the shift rod 49 corresponding to the engaged state of the sliding shift sleeve 47 with regard to the one gear wheel, an assigned locking face SF-1 of the shift rod 49 is congruent with the geometric axis 27—27 for the movements of the linearly movable locking elements 26, 45 and 54. In the gear speed position 49-2 of the shift rod 49 corresponding to the engaged state of the sliding shift sleeve 47 with regard to the other gear wheel, an assigned locking face SF-2 of the shift rod 49 is congruent with the geometric axis 27—27 for the movements of the linearly movable locking elements 26, 45 and 54.

The locking elements 41, 45 and 54 interact as follows:

In the end position of the linearly movable locking element 45 for engagement in the recess 42 of the pivotably movable locking element 41, the linearly movable locking element 54 is activated, by the adjacent stop face 46-45(54) of the linearly movable locking element 45, into its end position for engagement in the recess 53 of the shift rod 49.

In the gear speed positions 49-1 and 49-2 of the shift rod 49, the associated linearly movable locking element 54 is activated, by means of the respective inclined face 29-49(54) of the recess 53, into its end position for engagement in the recess 42 of the pivotably movable locking element 41 by means of the respective sphere 55, in which case, in this end position, the stop face 46-54(45) of the linearly movable locking element 54 has activated the linearly movable locking element 45 into its end position, or keeps it there, for engagement in the recess 31 of the pivotably movable locking element 32 by means of the respective other sphere 55.

Furthermore, the arrangement is effected such that the activation of a shift rod or shift rocker into a gear speed position is possible only if all the other shift rods and all the shift rockers are in their neutral position.

Furthermore, the configuration of the inclined faces 29 relative to the geometric axis 27—27 is effected such that longitudinal movements of the inclined faces 29 in the directions of the axis of rotation 12—12 lead to longitudinal movements of the locking elements 26, 45 and 54 in the directions of the axis 27—27.

The shift rods 15 and 49 are displaceably mounted in each case in one linear bearing 7 or 8 which is fixed to an end plate 59 which is arranged in a casing plane of the gearbox casing, which is perpendicular with respect to the axes of rotation 12—12 and 13—13, as well as above the gearbox shafts and can be immovably secured by means of lateral attachment points 60 and 61 to corresponding attachment points of the gearbox casing which are in the interior of the casing.

The end plate 59 is a component of a shift casing unit 14 which also includes bearing brackets 62 and 63 which are arranged on each side of the shift rockers 22 and 37 and which can be fixed in relation to the gearbox casing at their front ends by means of pin-like extensions 62-1 and 63-1 and in relation to the gearbox casing at their rear ends by means of attachment brackets 62-2 and 63-2, on the one hand, and in relation to the end plate 59 by means of extensions 62-3 and 63-3, on the other.

In each case the two bearing bolts 64 for the pivotable mounting of the shift rockers 22 and 37 are arranged fixedly in relation to the bearing brackets 62 and 63.

The locking mechanism casing 56 has a partial casing 57 which is attached to the end plate 59, is constructed with a U-shaped cross-section and encloses the box-shaped linearly movable locking elements 26, 45 and 54 on three sides in a positively locking fashion. The partial casing 57 is provided, on its side facing the pivotably movable locking elements 32 and 41, with in each case one slot 57-1 for one of the spheres 55 to pass through, the slot 57-1 being located centrally with respect to the relevant casing plane V—V and VI—VI for the arrangement of the associated pivotably movable locking element 32 or 41.

The partial casing 57 has two pairs of guide webs 58-58 which are each arranged symmetrically with respect to one of the casing planes V—V and VI—VI and on each side of the respective pivotably movable locking element 32 or 41 in order to guide it in the directions which are perpendicular with respect to the axis 27—27. These guide webs 58 start from the respective slot 57-1, as a result of which the respective sphere 55 is captively accommodated in the locking mechanism casing 56, which is terminated on the open side of the partial casing 57 by the end plate 59.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A shifting assembly for a change speed gearbox comprising:
   a first axially displaceable shift rod operable to actuate a first gear wheel clutch,
   a first pivotably displaceable shift rocker operable to actuate a second gear wheel clutch,
   a first pivotably movable locking element carried by the first shift rocker,
   a first linearly movable locking element extending transversely to, and selectively lockingly engaging with the first shift rod,
   a second pivotably displaceable shift rocker operable to actuate a third gear wheel clutch, and a second pivotably movable locking element carried by the second shift rocker and having an end selectively operably engageable with said first linearly movable locking element, said locking elements being configured to assure locking of other of said shift rockers and shift rod when any one of said shift rockers and shift rod are moved to clutch actuating positions.

2. A shifting assembly according to claim 1, wherein said first pivotably movable locking element is mounted at the first shift rocker for pivotal movement about an axis extending transversely to the first shift rod displacement direction, said first pivotably movable locking element being operably abuttingly engaged with an end of said first linearly movable locking element facing away from the first shift rod.

3. A shifting assembly according to claim 2, wherein said first shift rod includes a recess accepting an end of said first linearly movable locking element which is disposed adjacent said first pivotably movable locking element.

4. A shifting assembly according to claim 3, comprising a spherical member engaging respective inclined surfaces of said first pivotably movable locking element and said first linearly movable locking element.

5. A shifting assembly according to claim 1, comprising a second linearly movable locking element aligned with said first linearly movable locking element, wherein said second pivotably movable locking element abuttingly engages a spherical member disposed at an end of said second linearly movable locking element facing away from the first linearly movable locking element.

6. A shifting assembly according to claim 5, wherein said first pivotably movable locking element abuttingly engages a spherical member disposed between inclined surfaces on said first and second linearly movable locking elements.

7. A shifting assembly according to claim 1, comprising:
a second axially displaceable shift rod operable to actuate a fourth gear wheel clutch, and
a further linearly movable locking element extending transversely to, and selectively lockingly engaging with, the second shift rod,
said locking elements being configured to assure locking of other of said shift rockers and shift rods when any one of said shift rockers and shift rods are moved to clutch actuating positions.

8. A shifting assembly according to claim 6, comprising:
a second axially displaceable shift rod operable to actuate a fourth gear wheel clutch, and
a further linearly movable locking element extending transversely to, and selectively lockingly engaging with, the second shift rod,
said locking elements being configured to assure locking of other of said shift rockers and shift rods when any one of said shift rockers and shift rods are moved to clutch actuating positions.

9. A shifting assembly according to claim 8, wherein said first, second and further linearly movable locking elements are all aligned with one another, and disposed end to end, such that axial forces from respective ones of said first and second pivotably movable locking elements are transmitted to respective other of said linearly movable locking elements by way of respective spherical members disposed between facing end faces of said linearly movable locking elements.

10. A shifting assembly according to claim 9, wherein said linearly movable locking elements are slidably guided in a fixed housing part.

11. A shifting assembly according to claim 1, wherein the first linearly movable locking element is constructed as a box-shaped steel stamping.

12. A shifting assembly according to claim 1, comprising a box-shaped locking mechanism casing connected with a gearbox housing supporting said shift assembly.

13. A shifting assembly according to claim 12, wherein the first linearly movable locking element is guidably supported in said casing.

14. A shifting assembly according to claim 13, wherein the locking mechanism casing is formed as a U-shaped partial casing which encloses the linearly movable locking element.

15. A shifting assembly according to claim 5, comprising a box-shaped locking mechanism casing connected with a gearbox housing supporting said shift assembly, wherein the linearly movable locking elements are guidably supported in said casing.

16. A shifting assembly according to claim 15, wherein the locking mechanism casing is formed as a U-shaped casing which encloses the linearly movable locking elements.

17. A shifting assembly according to claim 16, wherein the casing has guide webs which are arranged on both sides of the pivotably movable locking elements.

18. A shifting assembly according to claim 17, wherein the locking mechanism casing is secured to an end plate which is arranged fixedly in terms of movement in relation to the gearbox housing.

19. A shifting assembly according to claim 12, wherein the locking mechanism casing forms with the linearly movable locking elements a subassembly which is mounted within the gearbox housing.

20. A shifting assembly according to claim 17, wherein the locking mechanism casing forms with the linearly movable locking elements a subassembly which is mounted within the gearbox housing.

21. A shifting assembly for a change speed gearbox comprising:
a first axially displaceable shift rod operable to actuate a first gear wheel clutch,
a first pivotably displaceable shift rocker operable to actuate a second gear wheel clutch,
a first pivotably movable locking element carried by the first shift rocker, said first pivotably movable locking element being pivotally mounted on the first shift rocker for pivotable movement about a pivot connection spaced from a pivot connection of the first shift rocker with a gear casing,
and a first linearly movable locking element extending transversely to, and selectively lockingly abuttingly engaging with a locking recess in the first shift rod,
wherein said first pivotably movable locking element and first linearly movable -locking element are configured to engage one another to assure locking of the first shift rocker when the first shift rod is actuating the first gear wheel clutch and locking of the first shift rod when the first shift rocker is actuating the second gear wheel clutch.

22. A shifting assembly according to claim 21, wherein said first linearly movable locking element has a first inclined surface on an end thereof facing away from the first shift rod, and wherein a first spherical member engages said first inclined surface and said first pivotal locking element.

23. A shifting assembly according to claim 21, wherein the locking recess of the first shift rod is aligned with and engaged by the first linearly movable locking element when said first shift rod is in a neutral position corresponding to a disengaged position of the first gear wheel clutch.

24. A shifting assembly according to claim 23, wherein the first pivotably movable locking element includes a recess which is aligned with and lockingly engageable with an end of the first linearly movably locking element facing away from the first shift rod when said first shift rocker is in a disengaged position of the second gear wheel clutch.

25. A shifting assembly according to claim 21, wherein said first pivotably movable locking element is mounted on the first shift rocker for pivotal movement about an axis extending transversely to the first shift rod displacement direction, said first pivotably movable locking element being operably abuttingly engaged with an end of said first linearly movable locking element facing away from the first shift rod.

26. A shifting assembly according to claim 25, wherein said first shift rod includes a recess accepting an end of said first linearly movable locking element which is disposed adjacent said first pivotably movable locking element.

27. A shifting assembly according to claim 26, comprising a spherical member engaging respective inclined surfaces of said first pivotably movable locking element and said first linearly movable locking element.

* * * * *